United States Patent [19]

Farmery

[11] 3,994,438

[45] Nov. 30, 1976

[54] SPRAY APPARATUS

[75] Inventor: Horstine Farmery, North Newbald, England

[73] Assignee: Horstine Farmery Limited

[22] Filed: Aug. 1, 1975

[21] Appl. No.: 600,948

[30] Foreign Application Priority Data

Aug. 7, 1974 United Kingdom............... 34878/74

[52] U.S. Cl.................................... 239/7; 239/103; 239/222; 239/223
[51] Int. Cl.²...................... B05B 17/04; B05B 3/08
[58] Field of Search................... 239/7, 222, 222.11, 239/223, 224, 103

[56] References Cited
UNITED STATES PATENTS

| 913,686 | 3/1909 | Brandt | 239/224 X |
|---|---|---|---|
| 1,488,356 | 3/1924 | Linké | 239/222 X |
| 1,994,239 | 3/1935 | Beekhuis | 239/222.11 X |
| 2,064,125 | 12/1936 | Norris | 239/222 X |
| 2,258,445 | 10/1941 | Coopey | 239/224 |
| 2,545,490 | 3/1951 | Norris | 239/222 X |
| 2,815,246 | 12/1957 | Nyrop | 239/223 |
| 3,344,836 | 10/1967 | Kopczynski | 239/223 X |
| 3,749,313 | 7/1973 | Weitmann | 239/224 X |
| 3,885,496 | 5/1975 | Breitweg et al. | 239/222.11 X |

*Primary Examiner*—Robert S. Ward, Jr.
*Attorney, Agent, or Firm*—Bacon & Thomas

[57] ABSTRACT

A method and apparatus for distributing a flowable material onto a base surface and wherein a rotary member is rotatably supported concentrically within a mask, a flowable material supply to the rotary member deposits said material on the rotary member and said material is centrifuged uniformly from the periphery of the rotary member, said mask has slots through which selected segments of centrifuged material can pass while the spray segments striking the inside of the mask between the slots is arrested to achieve a spray pattern on the base surface in accordance with the arrangement of slots in the mask. In a preferred embodiment a second rotary member is located beneath the mask and material arrested by the mask constitutes a material supply to the second rotary member.

37 Claims, 5 Drawing Figures

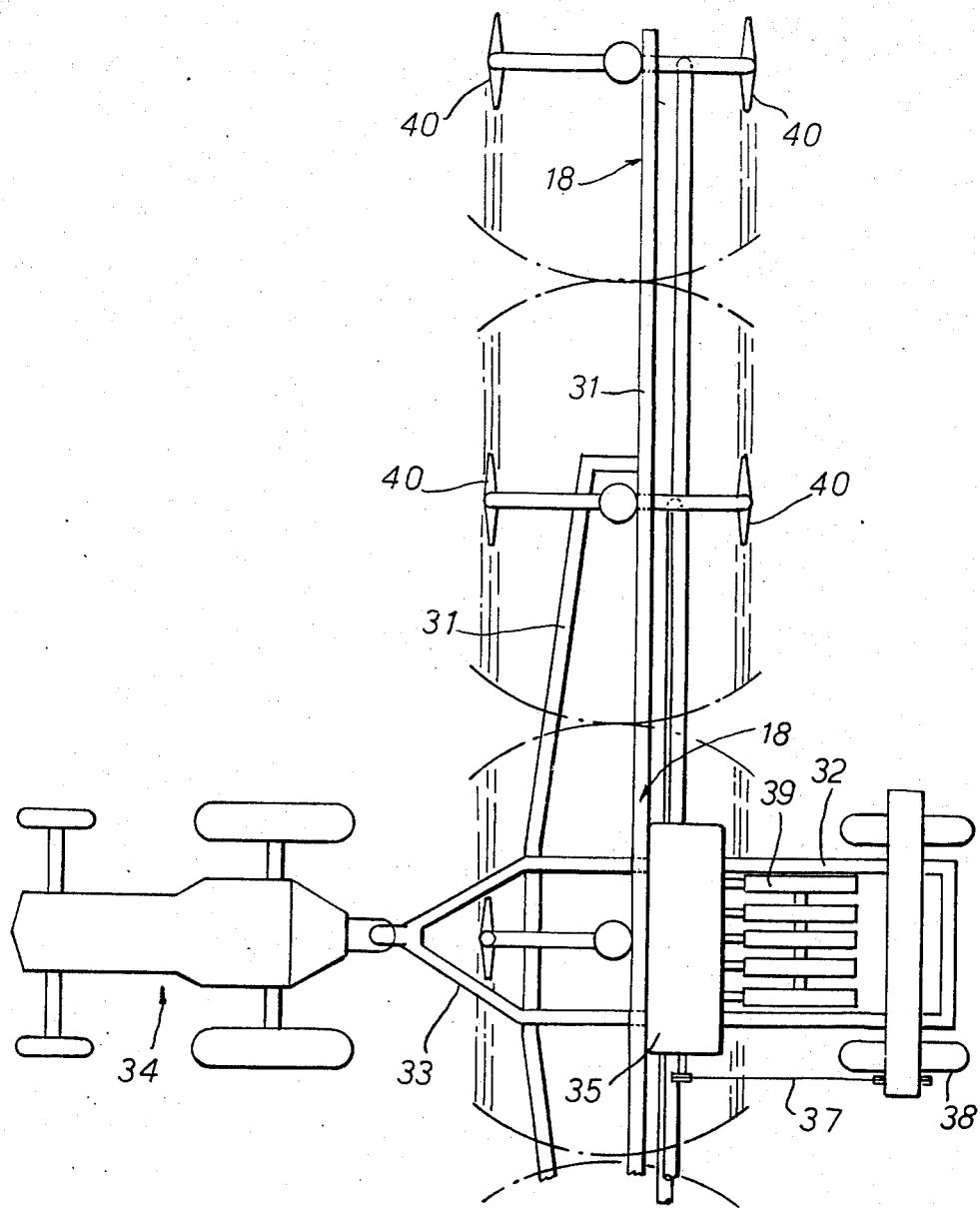
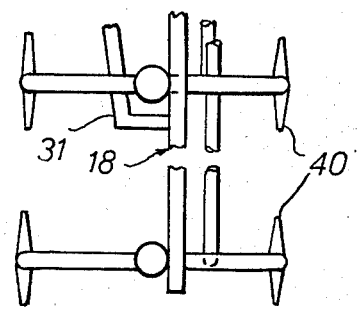
—FIG.4—

SPRAY APPARATUS

This invention relates to a method and apparatus for distributing flowable material and has particular application to the distribution of chemical aids onto, or into, growing crops.

Many chemical aids, for example, weed killers, insecticides, and growth promotion aids, are supplied to the farmer in liquid form and other aids supplied in powder or granule form are best distributed as a solution or suspension in a medium, generally water, so that most aids are applied to the crop as a liquid. The convention liquid distributing means is the nozzle and, in practice, a liquid spraying equipment would comprise a plurality of nozzles arranged to spray liquid in an overlapping spray pattern to ensure covering all the ground traversed by the spraying equipment.

A serious disadvanage of the conventional nozzle is that it produces a wide range of droplet sizes, the small droplets tend to drift away from the target area in ambient air currents and the large droplets contain a excessive amount of chemical aid and are therefore wasteful. Further, it is extremely difficult to obtain uniform performance from a plurality of nozzles and the actual spray pattern of most nozzles is unsuitable for distributing a chemical aid uniformly over the target area.

Because of the above difficulty farmers find it necessary to dilute the chemical aid, often with up to 50 times its volume, of water, and this not only places a great demand for water at the treatment location but it also increases the weight of the spray equipment to the detriment of the crop.

The present invention seeks to provide a method and apparatus for distributing a flowable material in accordance with a desired spray pattern with a minimum of loss and wastage of the material within the target area.

According to the present invention a method for distributing a flowable material comprises the steps of centrifuging the material from a peripheral region of a rotary member to produce a spray pattern substantially uniformly disposed about the axis of rotation of the rotary member and interrupting the free flow of material in the uniform spray pattern at a plurality of locations spaced about the axis of rotation of the rotary member to establish a spray pattern defined by selected sectors of the initial spray pattern.

Preferably the interruption of free material centrifuged from the rotary member is effected by a mask, having a plurality of slots or openings through which the material can pass and, in one method in accordance with the invention, the material which does not pass through the mask is collected therefrom and returned to the rotary member.

Preferably two rotary members are provided, at least one of which is allowed to distribute substantially the whole of the flowable material supplied thereto substantially uniformly about its axis of rotation, and the material centrifuged from the other rotary member is obstructed at a number of locations spaced about its axis whereby, said other member imposes a predetermined spray pattern on the spray pattern of the first rotary member.

Preferably the two rotary members are arranged for rotation about a common axis and preferably the obstructed flowable material is collected and constitutes a flowable material supply for the member which does not have its spray pattern interrupted.

According to one aspect of this invention a method of applying a flowable material onto a base in accordance with a desired distribution pattern comprises the steps of supplying flowable material to a rotary member rotating about an axis substantially vertical to said base surface, allowing the rotary member to centrifuge flowable material supplied thereto from a peripheral region thereof to obtain a spray pattern of substantially uniform particle or droplet size uniformly about the periphery of the rotary member, displacing the rotary member over the base and interrupting the uniform spray pattern at a number of locations spaced about the axis of the rotary member but fixed relative to the direction of displacement of said member to obtain from the uninterrupted parts of the spray pattern a desired distribution of flowable material over the base surface transverse to the said direction of travel.

Preferably more than one rotary member is provided for distributing flowable material therefrom and all of said rotary members are displaced in the direction of travel at the same speed.

It has been found by experiment that for a given diameter of the peripheral region of a rotary member and a given viscosity of a liquid the rotational speed can be readily determined to produce droplets within a relatively narrow range of sizes and thus the best droplet size for hitting the base surface can be obtained to give maximum efficient use of the material.

Further, as the material is centrifuged rather than passed through the small openings in nozzles, liquid chemicals can be distributed without being diluted for with the minimum of dilution and many materials which could not normally be sprayed by conventional spray equipment can be dispersed by the rotary members proposed by the present invention.

When the apparatus is to be used to spray a base surface and the rate of displacement of the apparatus over the base surface is not constant, such as in the spraying of crops, the rotary member or members can be run at constant speed and the supply of flowable material thereto regulated in accordance with the ground speed whereby the base surface can be sprayed in accordance with a desired pattern independantly of the actual rate of displacement between the apparatus and the base surface.

According to another feature of the invention apparatus for distributing flowable material comprises a rotary member and a mask substantially concentric with the rotary member and having a plurality of slots aligned with the rotary member to permit only part of the material centrifuged from the rotary member to pass therethrough.

Preferably the apparatus includes means for rotating the rotary member and a supply duct for directing flowable material onto or into the rotary member.

Preferably the rotary member comprises a disc mounted on a shaft for rotation therewith and the mask includes an annular section having said slots therein and a conical section beneath said annular section.

Preferably said rotary member and said mask form a spray assembly mounted on a carriage for displacement relative to a base surface whereby the assembly can be given a positive displacement relative to the base surface and, when the assembly is to be used for agricultural purposes, the carriage is provided with wheels and adapted to be pushed or pulled over a field to be sprayed by the assembly.

Preferably a second rotary member comprising disc is mounted for rotation relative to the first rotary member and the second disc is adapted to receive flowable material thereonto and to centrifuge the flowable material therefrom in a spray pattern substantially uniform about the axis of the said second disc.

The second rotary member is preferably not used in conjunction with a mask and is so aligned with the masked member that when both members are operational to dispense flowable material the spray pattern of the masked member is superimposed on the spray pattern of the second member.

Preferably the two members are mounted for rotation about a common axis and preferably rotate in the same direction of rotation.

When the two members are axially aligned, of equal diameter, and are to rotate in the same direction, they may be mounted on a common shaft.

Preferably the masked member is located above the second member and flowable material caught by said mask is directed onto the second member.

Preferably the sum total of the peripheral lengths of all the slots is equal to the sum total of the peripheral length of the mask material between the slots.

In a preferred embodiment in accordance with the invention a plurality of rotary member and mask assemblies, each including a second rotary member, are arranged in spaced relationship on a carriage adapted to be towed by a tractor and the carriage includes a drive means for rotating all the rotary members at substantially constant and uniform speeds.

The carriage also includes a flowable liquid supply tank with pipes for ducting flowable liquid to each rotary member and a metering device, controlled by the forward motion of the carriage, for adjusting the supply of flowable material in dependence upon the speed of the carriage.

When the, or each, rotary member comprises a disc said disc may be made from any metal or plastics material which does not affect the flowable material and which can be wetted by said flowable material. The disc may present a flat or curved i.e. bowl shaped, flowable material centrifuging surface.

The mask may have fixed or adjustable slots therein and preferably the mask is arranged for at least limited rotation relative to the axis of the rotary member to allow the mask to be adjusted relative to a desired direction of displacement for the assembly.

The mask may include a pin adjacent to the leading edge of each slot to prevent particles of droplets of centrifuged flowable material from striking said leading edge. Alternatively the trailing edge of each mask tongue between adjacent slots may be inwardly turned or the whole of each tongue may be deflected to be substantially perpendicular to the path of particles or droplets impinging thereon when the apparatus is operational.

The invention will now be described further by way of exanple with reference to the accompanying drawings in which:

FIG. 4 shows a plan view of a towed carriage for mounting a plurality of assemblies and;

Figure 1:
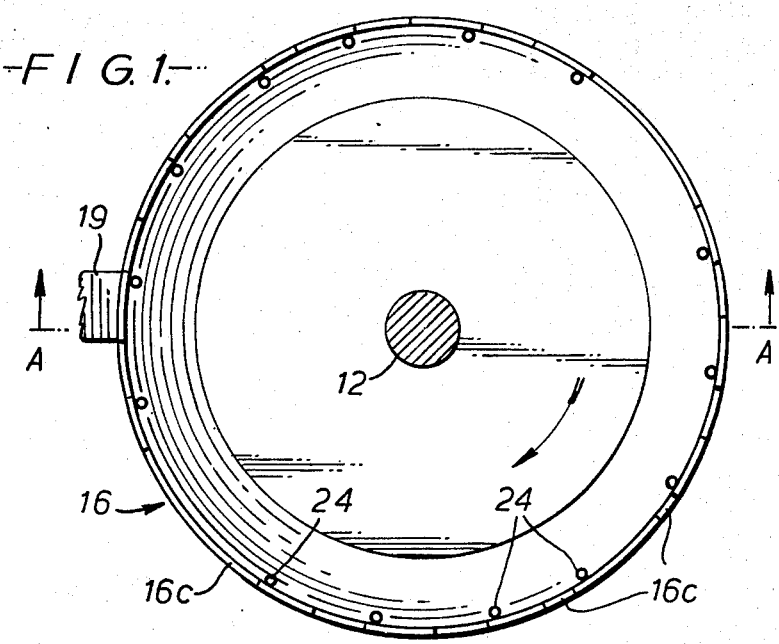
FIG. 1 shows a plan view of a rotatable member and mask assembly.
Figure 2:
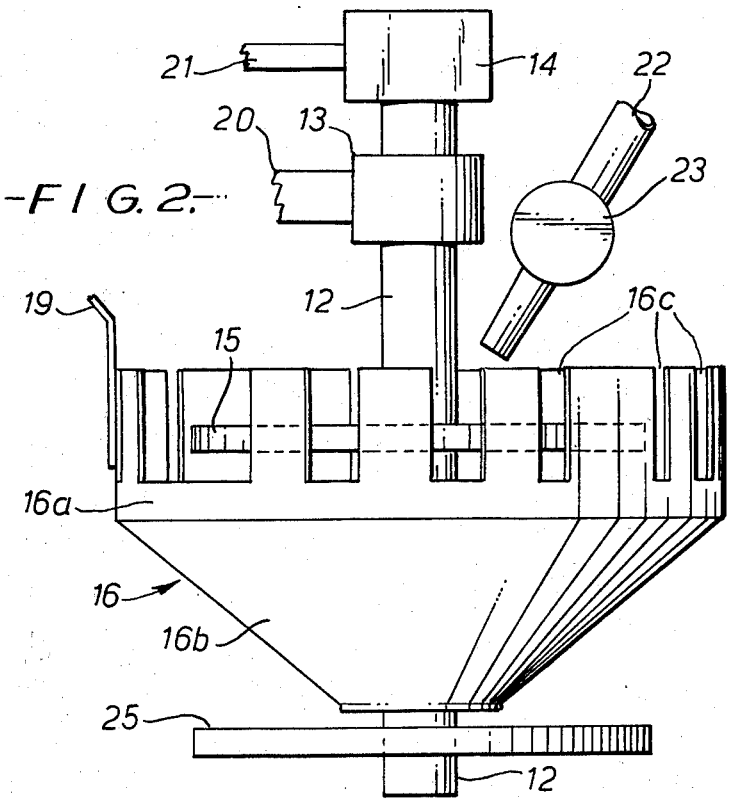
FIG. 2 shows a side view of the assembly illustrated in FIG. 1.
Figure 3:
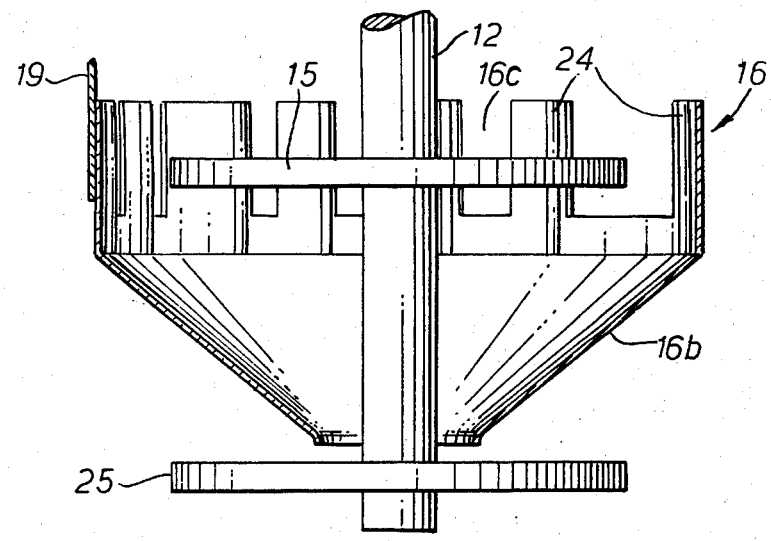
FIG. 3 shows a cross section through the assembly on the line 'A—A' in FIG. 1.

The assembly illustrated in FIG. 1, 2 and 3, comprises a shaft 12 supported vertically by a bearing 13 and rotable by a power unit, generally indicated by number 14. A rotary member, defined by a disc 15, is secured on the shaft 12 for rotation therewith and a mask 16, comprising an annular section 16a and a tapered section 16b beneath section 16a, is supported by a bracket 19 so as to lie concentric with the axis of shaft 12.

The annular section 16a has a plurality of open ended slots 16c therein extending parallel to the axis of shaft 12 and of differing circumferential widths and spacings, for reasons which will become apparent hereinafter. The mask 16 is supported from a carriage, such as the carriage 18 in FIGS. 4 and 5, by a bracket 19 and the bearing 13 and power unit 14 are supported from the carriage 18 by brackets 20 and 21 respectively.

When the assembly is operational power unit 14 rotates shaft 12, and thereby disc 15, at a substantially uniform speed relative to mask 16. A flowable liquid, such as weedkiller, is delivered onto the top surface of the disc 15 by way of a supply pipe 22, which includes a metering device 23, and by carefully regulating the rate of delivery of liquid and the rotational speed of the disc 15 droplets, of substantially uniform size, are centrifuged from the periphery of the disc 15.

With uniform distribution of the liquid on the disc a substantially uniform release of droplets about the periphery of disc 15 is obtained and, if the assemble is given a uniform displacement over a base surface and the mask 16 is omitted, the spray pattern from the disc 15 would result in an uneven distribution of the liquid transverse to the direction of displacement. Thus, the deposition of the liquid would increase in density towards the sides of the path covered by the spray pattern.

By providing the mask 16 with a plurality of slots 16c therein only part of the liquid centrifuged from the disc 15 is released from the assembly through the slots 16c and the liquid caught by the mask section 16a flows down into the conical section 16b.

Thus, by carefully selecting the circumferential position and width of each slot a desired deposition pattern can be obtained across the path covered by the spray and, for example, a substantially uniform distribution, light side with heavy centre distribution, heavy side with light centre distribution, or graduated distribution can be obtained.

It will be observed that the droplets are released tangentially from the periphery of the disc 15 and those droplets directed towards the leading edge of each slot 16c can, upon striking such an edge, splatter and break up into small droplets some of which can pass through the adjacent slot to the detriment of the spray pattern. To prevent such droplets issuing from the mask a rod 24 is secured inwardly of and adjacent the leading edge of each slot to protect said leading edge and prevent the release of droplets after such droplets have engaged the mask.

In an alternative embodiment (not shown) the leading edge of each slot may be turned inwardly to prevent the release of splattered droplets from the slots 16c and in a further embodiment the mask tongues between the slots 16c can be deflected so as to increase the angle between the inner mask surface and the droplets impinging thereon.

As stated hereinbefore the droplets obstructed by the annular mask section 16*a* flow down into the conical section 16*b* and this liquid can be returned for resupply via supply pipe 22. In the illustrated example however the conical section 16*b* has an open bottom and the liquid in section 16*b* falls through the open bottom onto a second disc 25 secured on shaft 12.

The spray pattern produced by the unmasked disc 25 will of course result in an uneven distribution of liquid across the path being traversed and in such a case the slots 16*c* in the mask 16 are arranged to develop a spray pattern from the rotary disc and mask assembly which, when superimposed on the spray pattern of the unmasked disc, produces the desired liquid distribution on pattern.

As will be seen from FIG. 1 the sum total of the circumferential widths of all the slots 16*c* is substantially equal to the sum total of the circumferential widths of the mask tongues between the slots whereby the liquid dispensed through the mask is approximately half the total liquid dispensed from the disc 15.

Figure 5:
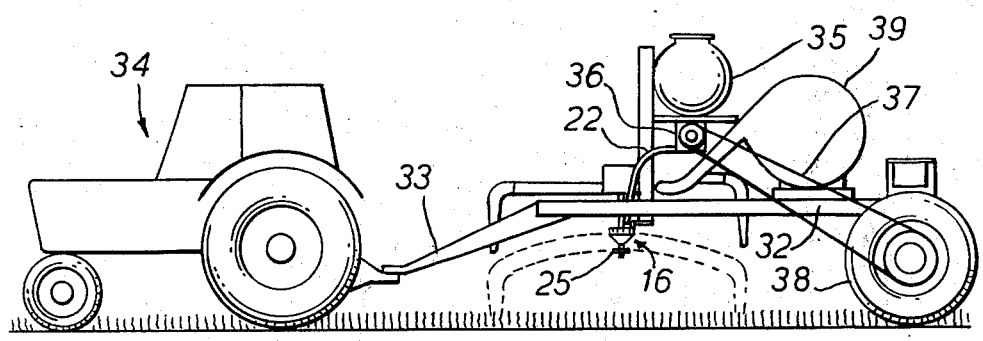
FIG. 5 shows a side view of the field spray equipment shown in FIG. 4.

FIGS. 4 and 5 illustrate a field spray equipment in accordance with the invention and wherein the carriage 18 comprises transverse beams 31 mounted on a wheeled chassis 32 which chassis 32 includes an "A" frame 33 by which the carriage assembly 31, 32, 33, can be attached to a towing vehicle, defined by tractor 34.

The carriage 18 supports five spray assemblies of the type shown in FIGS. 1, 2 and 3 in spaced relationship and the pitch of the assemblies and the spray patterns selected therefore are such that a substantially uniform liquid distribution across the whole of the ground traversed by the carriage and influenced by the spray apparatus is obtained.

The five assemblies on the carriage 18 may be driven by individual power units but are preferably driven by a single motor (not shown) mounted on the chassis and driving the separate assemblies through chain drives or shaft and pinion drives and by these latter arrangements all the assemblies can be rotated at substantially uniform speeds.

Again, a separate liquid supply can be provided for each assembly or, as illustrated, a common supply tank 35 may be provided with supply pipes 22 to each assembly. Further a metering device 23 can be provided for each supply pipe 22 or, as illustrated in FIGS. 4 and 5, a single metering device 36 may be provided at the outlet of tank 35 and said metering device 36 controlled by a chain drive 37 to a land wheel 38 of the chassis 32. By this means the volume of liquid delivered to the assemblies becomes dependant upon the land speed of the spray equipment and the desired distribution of liquid thus becomes independent of the land speed of the equipment.

The illustrated equipment also includes air compressors 39 mounted on chassis 32 and adapted to discharge air through nozzles 40 mounted before and after each spray assembly relative to the direction of displacement of the apparatus. The nozzles 40 discharge air flows downwardly to assist penetration and distribution of the droplets within the crop.

The invention has been described with reference to a specific embodiment. It will be appreciated that the invention is not limited thereto but rather is limited only by the scope of the appended claims.

I claim:

1. A method for distributing a flowable material onto a base surface comprising the steps of: centrifuging the material from a peripheral region of a rotary member to produce a spray pattern substantially uniformly disposed about the axis of rotation of the rotary member; interrupting the free flow of material in the uniform spray pattern at a plurality of locations spaced about the axis of rotation of the rotary member to establish a spray pattern defined by selected sectors of the initial uniform spray pattern; and transversing the rotary member over the base surface with said locations fixed relative to the direction of displacement over the base surface to obtain from the interrupted spray pattern a desired distribution of flowable material over the base surface transverse to the said direction of displacement.

2. A method as claimed in claim 1 and including the steps of continuously supplying flowable material at a substantially uniform rate, rotating said rotary member at a substantially uniform rate, and transversing the rotary member over the base surface at a substantially uniform height and rate of displacement to obtain a substantially uniform distribution of material over the base surface in the direction of displacement.

3. A method as claimed in claim 1 including the steps of regulating the rate of flowable material supply to the rotary member in dependence upon the rate of displacement over the base surface.

4. A method as claimed in claim 3 including the step of terminating the supply of flowable material to the rotary member when the peripheral speed of the rotary member falls below a predetermined minimum speed.

5. A method as claimed in claim 1 in which the material interrupted from the spray pattern at said locations is collected and returned to the rotary member for re-distribution therefrom.

6. A method as claimed in claim 1 including the steps of collecting the material interrupted from the spray pattern at said locations, supplying said collected material to a second rotary member and centrifuging the material from said second rotary member to establish a spray pattern therefrom different from the interrupted spray pattern from the first rotary member.

7. A method as claimed in claim 6 in which the spray pattern from the second rotary member comprises an uninterrupted distribution uniformly about the rotational axis of the second rotary member.

8. A method as claimed in claim 6 including the steps of locating the second rotary member relative to the first rotary member such that the interrupted spray pattern of said first rotary member is superimposed on the spray pattern of the second rotary member.

9. A method as claimed in claim 6 wherein the volume of material distributed in the interrupted spray pattern is substantially equal to the volume of material distributed in the spray pattern from the second rotary member.

10. A method as claimed in claim 1 including the further step of regulating the rate of flowable material supply to the rotary member in dependence upon the peripheral speed of the rotary member.

11. A method for distributing a flowable material over a substantially horizontal base surface comprising the steps of supporting two disc-like rotary members of substantially uniform diameter on a common drive shaft with the rotational axis of said shaft substantially vertical, said shaft passing centrally through said rotary members and supporting said members in vertically spaced relationship at substantially fixed height above said base surface, surrounding the highest one of said rotary members with a mask having slots therein, continuously displacing said shaft and rotary members supported thereon over the base surface, supplying flowable material to the highest one of said rotary members, rotating the shaft, and thereby the two rotary members, at a substantially constant peripheral speed sufficient to centrifuge the material supplied to the said higher rotary member uniformly from the periphery thereof allowing free flow of material centrifuged from the said highest rotary member through the said slots in the mask, collecting the material centrifuged from the said highest rotary member and arrested by the mask material between said slots, directing said collected material to a material supply for the lower rotary member and centrifuging the material from said lower rotary member, whereby the interrupted flow pattern from the first rotary member is superimposed on the flow pattern from the lower rotary member to obtain a desired distribution of material transverse to the direction of displacement over the base surface.

12. A method as claimed in claim 11 and wherein the rate of flow of material disbursed in the interrupted flow pattern from the higher rotary member is substantially equal to the rate of flow of material from the lower rotary member.

13. A method as claimed in claim 11 wherein the interrupted spray pattern is arranged to produce across the area of the base surface upon which the material is deposited light side with heavy centre deposition of material or heavy side with light centre deposition of material.

14. A method as claimed in claim 11 in which the interrupted spray pattern, when superimposed on the spray pattern from the second or lower rotary member, produces a substantially uniform distribution of material transverse to the direction of displacement over the base surface.

15. Apparatus for distributing a flowable material onto a base surface comprising a spray assembly adapted to be supported above the base surface and including a rotary member and a non-rotating mask substantially concentric with the rotary member, said mask including means for permitting selected segments of material centrifuged uniformly from the rotary member to pass therethrough and for obstructing the remaining segments of centrifuged material from passing therethrough whereby to establish an interrupted spray pattern distribution on said base surface, said permitting means including a plurality of slots through said mask, said slots being circumferentially spaced around the entire periphery of said mask.

16. Apparatus as claimed in claim 15 in which said rotary member comprises a disc, one surface of which defines a material receiving surface for the rotary member, with a peripheral wall upstanding from said surface material receiving surface.

17. Apparatus as claimed in claim 16 in which said peripheral wall extends outwardly from said surface to a free edge and said free edge defines the edge from which material is centrifuged.

18. Apparatus as claimed in claim 16 in which the internal surface of the peripheral wall is grooved and said grooves lie in planes passing through the rotational axis of the rotary member.

19. Apparatus as claimed in claim 16 in which the free peripheral edge of the peripheral wall is notched.

20. Apparatus as claimed in claim 15 in which the sum total of the peripheral lengths of all the slots in the mask is equal to the sum total of the peripheral length of mask material between the slots.

21. Apparatus as claimed in claim 15 in which the mask includes an annular section within which the rotary member is located and said slots are limited to said annular section.

22. Apparatus as claimed in claim 15 in which the rotary member is made from a plastics material.

23. Apparatus as claimed in claim 15 in which the spray assembly is mounted on a carriage which is capable of being transversed over said base surface, and which is capable of supporting the assembly at a substantially constant height above the base surface, the rotational axis for the spray assembly being located substantially vertically.

24. Apparatus as claimed in claim 16 in which means are provided for supplying flowable material to the material receiving surface of the disc, said means including a metering device for controlling the rate of flow of material to the rotary member and a shut-off device for terminating the flow of material to the disc when the disc speed falls below a predetermined level.

25. Apparatus as claimed in claim 15 in which duct means are provided for directing flowable material obstructed by the mask back to the rotary member.

26. Apparatus as claimed in claim 15 in which said rotary member is a first rotary member and in which the spray assembly includes: a second rotary member, a drive for rotating said second rotary member, and a duct for supplying flowable material to said second rotary member.

27. Apparatus as claimed in claim 26 in which the second rotary member has substantially identical dimensions as said first rotary member.

28. Apparatus as claimed in claim 26 in which the first and the second rotary members are mounted on a common drive shaft.

29. Apparatus as claimed in claim 15 wherein said spray assembly is mounted on a carriage which is capable of being displaced over the base surface, said rotary member being a first disc-like rotary member secured on a substantially vertical drive shaft, and wherein said mask surrounds said first rotary member and includes an annular section with said slots therein, said slots being aligned with said first rotary member, said mask including a conical section beneath said annular section, said spray assembly including: a second rotary member secured on said drive shaft beneath said mask, a flowable material supply duct to the top surface of said first rotary member, and a flowable material supply duct from the lower regions of the conical section of the mask to said second rotary member.

30. Apparatus as claimed in claim 15 in which the spray assembly comprises an electric motor for rotating the rotary member within the mask.

31. Apparatus as claimed in claim 29 in which the carriage includes means for rotating the drive shaft in a speed range dependent upon the viscosity of the flowable material, at which speed range flowable material is centrifuged from a peripheral edge of each rotary member uniformly about the axis of rotation and of substantially uniform droplet size.

32. Apparatus as claimed in claim 31 in which said means for rotating the drive shaft is selected from the group consisting of pneumatic, hydraulic, electrical or mechanical devices, the power source for which is supported by the carriage.

33. Apparatus as claimed in claim 23 in which the carriage includes means for directing air blasts downwardly onto spray patterns from the rotary members forwardly of and rearwardly of the spray assembly in the direction of displacement over the base surface.

34. Apparatus as claimed in claim 23 and wherein a plurality of spray assemblies are supported in spaced relationship on the carriage.

35. Apparatus as claimed in claim 15 in which the mask is rotatably adjustable about the axis of rotation for the rotary member therein.

36. Apparatus as claimed in claim 15 in which the rotary member is made from a metal.

37. Apparatus as claimed in claim 15 wherein said slots are elongated and extend parallel to the axis of the rotary member, some of said slots being of different circumferential widths than the circumferential widths of others of said slots.

* * * * *